Figure 1:
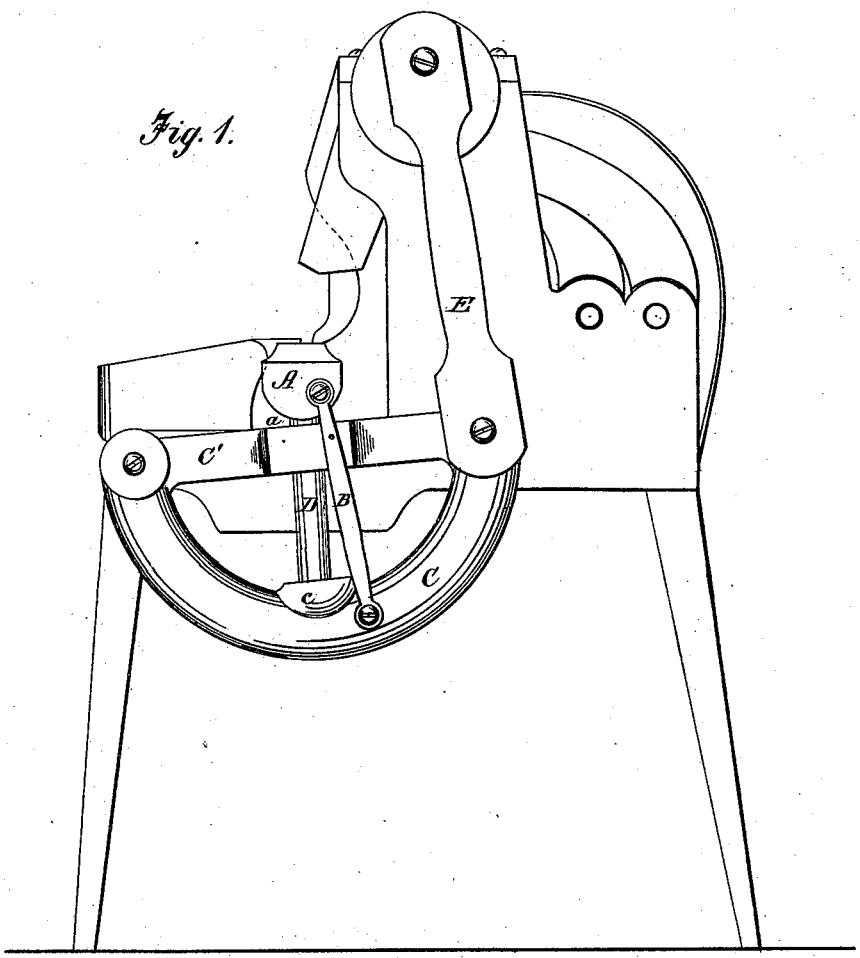

C. P. WEAVER.
MACHINES FOR MAKING TACKS.

No. 173,378.   Patented Feb. 8, 1876.

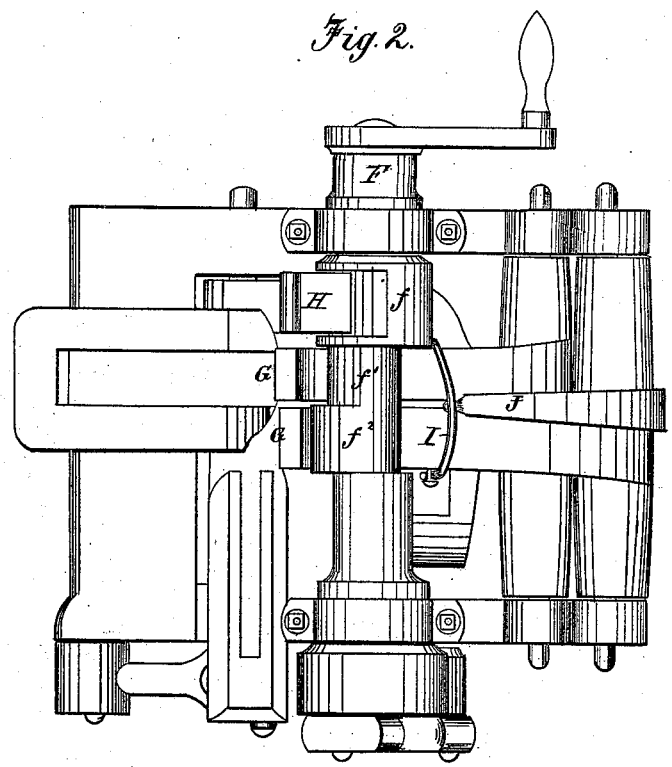

UNITED STATES PATENT OFFICE.

CHARLES P. WEAVER, OF NORRISTOWN, PENNSYLVANIA.

IMPROVEMENT IN MACHINES FOR MAKING TACKS.

Specification forming part of Letters Patent No. 173,378, dated February 8, 1876; application filed October 27, 1875.

*To all whom it may concern:*

Be it known that I, CHARLES P. WEAVER, of Norristown, in the county of Montgomery and State of Pennsylvania, have invented a new and Improved Tack-Machine; and I do hereby declare that the following is a full, clear, and exact description of the same, reference being had to the accompanying drawing, forming a part of this specification, in which—

Figure 1 is a side elevation; Fig. 2, a plan view.

The invention relates to machines with two cutting-jaws for making tacks or small nails; and consists in an improvement, which will first be described in connection with the drawing, and then pointed out in the claim.

A represents the header-lever, pivoted subjacently at its front end, and connected by a pivoted strap, B, with the middle, or near the middle, of arc-bar C, through whose slotted chord $C'$ passes a pin, D, fitting loosely in sockets $a\ c$. E is a crank-pitman, connecting with the shaft F, having cams $f f^1 f^2$, that operate the cutter-holders G G and griper H. The cutters are held up by a yoke, I, and spring J to the shaft. The lever C $C'$ being connected by pin D and link or strap B with the header-lever A, I am enabled to apply the power directly on the line of the work, thereby avoiding all lateral strain, and dispensing with the usual long arms and crooked ends of the heading-lever. I am also enabled to move the cross-beam that supports the center-points close up to the lever, and thus make the machine more compact. I also equalize the strain by dividing the bearing, and bringing one-half directly over the front leg of the machine, and the other half on the spindle-post.

By this improvement I reduce the size and weight of all new tack-machines at least fifty per cent., while it is applicable to all machines for making tacks or small nails having two jaws, but not to the ordinary nail-machines having one cutting-jaw.

Having thus described my invention, what I claim as new is—

The combination, with a header-lever pivoted in front, of pivoted strap B, arc-bar C, having slotted chord $C'$, and the pin D, fitting loosely in sockets $a\ c$, and passing through middle of arc-bar, all constructed and arranged substantially as and for the purpose specified.

CHAS. P. WEAVER.

Witnesses:
H. K. WEAND,
THOMAS N. WENTZ.